3,435,041
2-ANILINOQUINOLINES
Alexander E. Drukker, Milwaukee, and Claude I. Judd, Mequon, Wis., assignors to Colgate-Palmolive Company, New York, N.Y., a corporation of Delaware
No Drawing. Filed Jan. 19, 1966, Ser. No. 521,519
Int. Cl. C07d 33/52, 33/18; A61k 27/00
U.S. Cl. 260—288                 3 Claims

ABSTRACT OF THE DISCLOSURE

The compounds are 2-anilinoquinolines which are useful as diuretic agents. A compound disclosed is 2-(2-benzoyl-4-chloro)anilino-4-phenyl-6-chloroquinoline.

---

The present invention relates to novel chemical compounds and a method of preparing them. More particularly, it relates to 2-anilinoquinolines having the formula

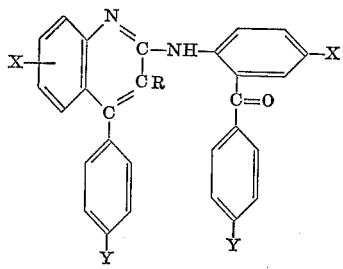

in which R is hydrogen or a lower alkyl of 1 to 4 carbon atoms such as methyl, ethyl or butyl; and X and Y are hydrogen, lower alkyl, lower alkoxy such as methoxy, ethoxy and propoxy, halo such as chloro, bromo or fluoro, acyl such as acetyl, acylamino, nitro, thioalkyl such as thiomethyl and thioethyl, sulfonylamino and $CF_3$.

The compounds of the present invention are unique chemical structures which can be prepared by the cyclization of 2-acylaminobenzophenone in the presence of a suitable acid catalyst, such as polyphosphoric acid. In view of the fact that the cyclization of the closely related 2-acylaminodiphenylmethanes with polyphosphoric acid yields 6-substituted morphanthridines, the discovery of these compounds and the method of preparing them was truly surprising.

In the preferred practice of the inventive method, 14 to 30 weight equivalents of polyphosphoric acid are employed per equivalent of the acylaminobenzophenone, and the mixture is heated for 0.5 to 5 hours at a temperature ranging from 80 to 200 degrees C. The reaction mixture is then cooled, poured into ice and the resulting precipitate isolated and purified by conventional techniques.

The process may be diagrammed as follows:

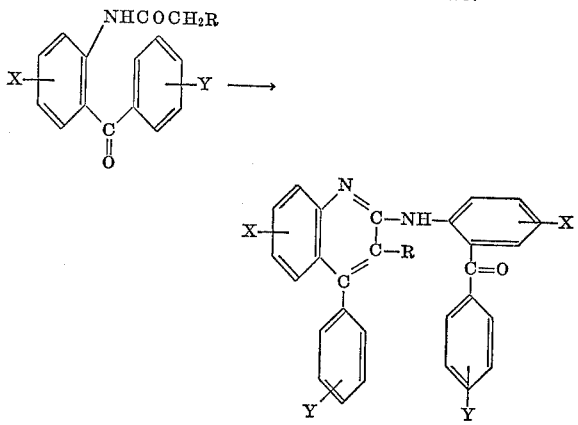

in which the symbols R, and X and Y are as previously described and also are groups which do not interfere with the reaction.

Representative of the compounds which may be made by the above process are the following:

2-(2-benzoyl-4-chloro)anilino-4-phenyl-6-chloroquinoline,
2-(2-benzoyl-4-chloro)anilino-3-methyl-4-phenyl-6-chloroquinoline,
2-(2-benzoyl)anilino-4-phenylquinoline,
2-(2-benzoyl-4-chloro)anilino-3-ethyl-4-phenyl-6-chloroquinoline,
2-(2-benzoyl)anilino-3-methyl-4-phenylquinoline,
2-(2-benzoyl-4-bromo)anilino-4-phenyl-6-bromoquinoline, and
2-(2-benzoyl-4-bromo)anilino-3-methyl-4-phenyl-6-bromoquinoline.

The novel compounds of the present invention have diuretic activity in animals. Although the compounds of this invention may be administered as pure compounds, it is advisable to first combine one or more of the compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration to a patient or, instead, the powders may be added to suitable foods and liquids, including water, to facilitate administration.

The powders may also be used to make tablets or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the active agents and may be administered one or more at a time at regular intervals. Such unit dosage forms, however, should generally contain a concentration of 0.1% to 10% by weight of one or more of the active agents. Unit dosage forms should advisably contain about 5 to 150 mg. of the active agents described herein.

A typical tablet may have the following composition:

|  | Mg. |
|---|---|
| 2-(2-benzoyl-4-chloro)anilino-4-phenyl-6-chloroquinoline | 10 |
| Starch, U.S.P. | 57 |
| Lactose, U.S.P. | 73 |
| Talc, U.S.P. | 9 |
| Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

|  | Mg. |
|---|---|
| 2-(2-benzoyl-4-chloro)anilino-4-phenyl-6-chloroquinoline | 10 |
| Lactose, U.S.P. | 200 |
| Starch, U.S.P. | 16 |
| Talc, U.S.P. | 8 |

The oral route is preferred for administering the active agents of this invention. However, other routes of administration, such as parenteral, may be employed.

The following examples are presented to illustrate the invention:

EXAMPLE 1

2-(2-benzoyl-4-chloro)anilino-4-phenyl-6-chloroquinoline

A mixture of 72 g. (0.262 mole) of 2-acetyl-amino-5-chlorobenzophenone and 2 kg. of polyphosphoric acid is heated 2 hours at 130°, the red solution which forms is slightly cooled and poured into 20 kg. of ice. The mixture is stirred and the yellow solid which forms is filtered off and recrystallized from benzene-ethanol to give 2-(2-benzoyl-4-chloro)anilino-4-phenyl - 6 - chloroquinoline, M.P. 192°.

*Analysis.*—Calcd. for $C_{28}H_{18}Cl_2N_2O$: C, 71.65; H, 3.87; N, 5.97; Cl, 15.11; O, 3.41. Found: C, 71.24; H, 3.97; N, 5.88; Cl, 15.00; O, 3.23.

EXAMPLE 2

2-(2-benzoyl-4-chloro)anilino-3-methyl-4-phenyl-6-chloroquinoline

The procedure of Example 1 is repeated employing 2-propionylamino-5-chlorobenzophenone in place of 2-acetylamino-5-chlorobenzophenone. The compound 2-(2-benzoyl-4-chloro)anilino-3-methyl - 4 - phenyl-6-chloroquinoline is obtained having a melting point of 229–230°.

*Analysis.*—Calcd. for $C_{29}H_{20}Cl_2N_2O$: C, 72.05; H, 4.17; N, 5.80; Cl, 14.67. Found: C, 72.12; H, 4.34; N, 5.90; Cl. 14.67.

We claim:
1. A compound of the formula

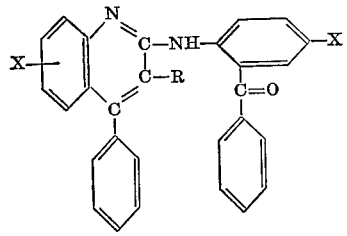

in which X is hydrogen or chloro and R is hydrogen or a lower alkyl.

2. A compound of claim 1 having the formula

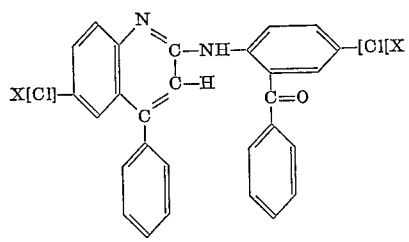

in which X is hydrogen or chloro.

3. A compound of claim 1 having the formula

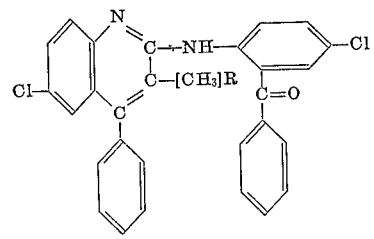

in which R is hydrogen or methyl.

References Cited

UNITED STATES PATENTS

| | | | |
|---|---|---|---|
| 2,419,199 | 4/1947 | Burckhalter | 260—288 X |
| 2,684,965 | 7/1954 | Weston | 260—288 X |
| 3,174,972 | 3/1965 | Allais et al. | 260—287 |
| 3,202,661 | 8/1965 | Brust et al. | 260—288 |

ALEX MAZEL, *Primary Examiner.*

D. A. DAUS, *Assistant Examiner.*

U.S. Cl. X.R.

260—239, 562; 424—258

PO-1050
(5/69)

UNITED STATES PATENT OFFICE
CERTIFICATE OF CORRECTION

Patent No. 3,435,041        Dated March 25, 1969

Inventor(s) Alexander E. Drukker and Claude I. Judd

It is certified that error appears in the above-identified patent and that said Letters Patent are hereby corrected as shown below:

Column 4, claim 2, that portion of the formula reading

X[Cl]-          should read    X- and that portion reading

-[Cl]X          should read    -X ;

Column 4, claim 3, that portion of the formula reading

C-[$CH_3$]R      should read    C-R

SIGNED AND SEALED

MAR 3 - 1970

(SEAL)
Attest:

Edward M. Fletcher, Jr.
Attesting Officer

WILLIAM E. SCHUYLER, JR.
                                        Commissioner of Patents